United States Patent [19]

Kim et al.

[11] Patent Number: 5,472,781
[45] Date of Patent: Dec. 5, 1995

[54] HIGH STRENGTH POLYESTER FILAMENTARY YARN

[75] Inventors: Kyeoghyeon Kim; Hagmug Kim; Seongjung Kim; Sangmin Lee; Hongjo Kim, all of Kyungbuk, Rep. of Korea

[73] Assignee: Kolon Industries, Inc., Seoul, Rep. of Korea

[21] Appl. No.: 340,452

[22] Filed: Nov. 14, 1994

Related U.S. Application Data

[63] Continuation of Ser. No. 989,366, Dec. 11, 1992, abandoned.

[30] Foreign Application Priority Data

| Dec. 13, 1991 | [KR] | Rep. of Korea | 91-22896 |
| Dec. 13, 1991 | [KR] | Rep. of Korea | 91-22898 |
| Dec. 14, 1991 | [KR] | Rep. of Korea | 91-23021 |

[51] Int. Cl.⁶ .................................................. D02G 3/00
[52] U.S. Cl. ........................ 428/364; 428/359; 428/395
[58] Field of Search ........................ 428/364, 394, 428/395, 375, 902; 152/151, 451, 507, 556; 264/211.12, 211.14; 57/902, 243

[56] References Cited

U.S. PATENT DOCUMENTS

| 3,673,143 | 6/1972 | Bair et al. ............................ 260/30.2 |
| 3,872,050 | 3/1973 | Benton et al. ......................... 260/37 |
| 4,101,525 | 7/1978 | Davis et al. |
| 4,195,052 | 3/1980 | Davis et al. |
| 4,209,559 | 6/1980 | Wada et al. |
| 4,491,657 | 1/1985 | Saito et al. ........................... 528/308.1 |
| 4,603,083 | 7/1986 | Tanaka et al. ......................... 428/364 |
| 5,049,339 | 9/1991 | Hrivnak et al. ....................... 264/210.8 |
| 5,049,447 | 9/1991 | Shindo et al. ......................... 428/373 |
| 5,067,538 | 11/1991 | Nelson et al. ........................ 152/451 |

FOREIGN PATENT DOCUMENTS

| 0169415 | 1/1986 | European Pat. Off. |
| 0295147 | 12/1988 | European Pat. Off. |
| 41-7892 | 4/1941 | Japan |
| 54-77794 | 6/1979 | Japan |
| 54-132697 | 10/1979 | Japan |
| 54-132696 | 10/1979 | Japan |
| 57-154411 | 9/1982 | Japan |
| 61-12952 | 1/1986 | Japan |
| 61-146876 | 7/1986 | Japan |
| 61-289115 | 12/1986 | Japan |
| 1-47575 | 10/1989 | Japan |
| 20-702096 | 12/1990 | Japan |
| 42-9137 | 5/1992 | Japan |
| 91-22897 | 10/1991 | Rep. of Korea |
| 91-23111 | 11/1991 | Rep. of Korea |

OTHER PUBLICATIONS

Journal of Material Science, vol. 22, 1987, 4292–4298, Ch. Oudet et al "Effects of Structure on the Tensile, Creep and Fatigue Properties of Polyester fibers".

(List continued on next page.)

*Primary Examiner*—Patrick J. Ryan
*Assistant Examiner*—J. M. Gray
*Attorney, Agent, or Firm*—Oblon, Spivak, McClelland, Maier & Neustadt

[57] ABSTRACT

A polyester multi-filamentary yarn having a novel internal microstructure, polyester tire cord produced from the yarn and a process for production thereof are provided. The polyester yarn has a novel three-phase microstructure consisting of crystalline, amorphous and mesomorphous portions which are changed to a structure having crystalline and amorphous portions during formation of a tire cord. The polyester resin contains at least 90 mol. % polyethylene teraphthalate. The resin is melt-spun and solidified by quenching to produce an undrawn yarn having a birefringence of 0.03 to 0.08, which is then drawn at a total draw ratio of 1.4:1 to 2.2:1 and thermally treated and relaxed. The resulting filamentary yarn is dipped in a rubber solution to produce a tire cord which exhibits excellent dimensional stability and fatigue resistance when it is incorporated into the rubber matrix of a tire.

15 Claims, 4 Drawing Sheets

OTHER PUBLICATIONS

Journal of Polymer Science: Part B. Polymer Physics, vol. 26, 1988, pp. 1657–1675, Prashant Desai, et al., "Fundamental aspects of stress, deformation, and Phase Transitions in Crystallizable Polymers: Experiments with Poly(ethylene Terephihalate) in Uniaxial Stress Fields".

Article in Journal of Japanese Rubber Associates, vol. 64, 1991, pp. 260–266 (with English abstract).

Basic Dynamics of Melt Spinning, pp. 174–201, J. Shimizu, et al., "Simulation of Dynamics and Structure Formation in High–Speed Melt Spinning".

Jouranal of Applied Polymer Science, vol. 37, pp. 594–616, 1989, R. Huisman, et al., "The Effect of Spinning Speed and Drawing Temperature on Structure and Properties of Poly-(Ethylene Terephthalate) Yarns".

Article in Polyester Textiles, 1988, pp. 195–212, Richard R. Dean, "New Polyester Tire Cord Developments".

------- : A CONVENTIONAL POLYESTER TIRE CORD
(COMPARATIVE EXAMPLE 17)

—·— : A CONVENTIONAL POLYESTER TIRE CORD
(COMPARATIVE EXAMPLE 15)

——— : AN IMPROVED POLYESTER TIRE CORD OF THIS INVENTION
(EXAMPLE 24)

HIGH STRENGTH POLYESTER FILAMENTARY YARN

This application is a Continuation of application Ser. No. 07/989,366, filed on Dec. 11, 1992, abandoned.

BACKGROUND OF THE INVENTION

(1) Field of the Invention

The present invention relates to an industrial polyester filamentary yarn and a tire cord formed from this filamentary yarn. More particularly, it relates to a polyester filamentary yarn, a tire cord having improved fatigue resistance due to increased thermal dimensional stability and strength, as well as a process for production of this yarn.

(2) Description of the Prior Art

In general, nylon, rayon, polyester etc. fibers are typical examples of the fibers which have been used as reinforcements in rubber tires.

Nylon tire cord has higher strength and toughness than the other materials due to the inherent properties of nylon fiber and has been generally used in bias tires for trucks, buses etc. Rayon tire cord provides a low degree of shrinkage and has good thermal and dimensional stability due to the inherent properties of rayon fiber and has been generally used in high speed radial travelling tires for passenger cars.

Unfortunately, nylon tire cord has poor dimensional stability due to its low modulus characteristics and high shrinkage and further exhibits flat spots due to its low glass transition temperature. Rayon tire cord also has low modulus characteristics and exhibits a sharp decrease in strength after the fibers have been formed into a tire cord.

In view of these defects found in both nylon and rayon tire cords, polyester tire cord has been widely used.

Prior art polyester fibers that have been used in tires have benzene rings in their molecular structure, and a rigid molecular chain. Accordingly, tire cord formed from polyester yarn has a good elastic modulus, good fatigue resistance, provides few flat spots, excellent creep resistance and excellent endurance. For these reasons, polyester tire cord has been widely used in radial tires for passenger cars.

However, in spite of the above described merits, conventional polyester tire cords do have a problem: they undergo substantial variation in their properties with temperature due, it is thought, to hysteresis effect. In particular, conventional industrial high strength polyester fibers generally exhibit substantial shrinkage when heated.

Also, when industrial polyester fibers have been incorporated into a rubber matrix of a tire, as the tires rotate during use the fiber is stretched and relaxed during each tire rotation. Further, the internal tire air pressure stresses the fiber, and tire rotation while axially loaded or stressed causes repeated stress variations, particularly on unsmooth surfaces.

Since more energy is consumed during the stretching of a fiber than is recovered during its relaxation, the difference of energy dissipates as heat. This is termed hysteresis or work loss. Significant temperature increases have been observed in rotating tires during use which are attributable at least in part to this fiber hysteresis effect.

The variation in properties caused by heat generation occurs due to moisture and amines contained in conventional rubber solutions used in rubber treatments for producing tire cord, and the observed variation tends to be increased when the content of carboxyl group is high, leading to a significant lowering of strength and fatigue resistance.

In recent years, as radial tires having high performance have been widely developed and used, the demand for polyester tire cords with superior properties, especially properties superior to those obtained with nylon or rayon tire cord, has been increasing. Therefore, research into development of a polyester tire cord having improved fatigue resistance by minimizing the heat generated due to the hysteresis effect has been undertaken.

Prior art methods for improving fatigue resistance of polyester fibers have focused on a chemical method for increasing stability by reducing the content of carboxyl groups in the polyester and a method wherein highly-oriented undrawn yarn produced using a polyester with a relatively low I.V.(intrinsic viscosity), or produced by employing a high-speed spinning process, is drawn.

References directed towards increased chemical stability are Japanese patent laid-open No. Sho. 54-132696 and 54-132697 which disclose the inhibition of deterioration due to thermal decomposition resulting from heat generation by reducing the carboxyl group content of the polyester. By reducing the content of terminal carboxyl groups via copolymerization with or melt-blending in an aliphatic polyester. The increased mobility of amorphous regions effects a reduction in heat generation leading to a reduction in thermal decomposition which effects improved fatigue resistance. But in this method, high crystalline polyester fiber cannot be obtained and the tenacity and initial elastic modulus of the material is always low. Thus, the shrinkage of the resulting fiber is increased and the product obtained is not a high quality tire cord yarn. Also, reducing the content of terminal group by adding a blocking agent has a disadvantage in that the degree of polymerization is lowered and the cost is increased.

References directed to a method of increasing thermal stability by high speed drawing are U.S. Pat. 4,101,525 and 4,195,052 which disclose an improvement in fatigue resistance by increasing the mobility of the molecular chains in the amorphous region high-speed spinning. In this process, the fatigue resistance is improved but the molecular chain length is irregular and long, and the relaxed molecular chains coexist so that the loss of tenacity is high. Also, a difference in properties between the inner and outer layer of fiber is effected so that the drawability decreases. The resultant variation in physical properties within these regions of the fiber is severe due to the presence of a defective microstructure.

Prior art processes for producing tire cord from yarn include, for example, Japanese patent laid-open No. Sho 61-12952 which discloses a tire cord having a tenacity of at least 7.0 g/d, an absorption peak temperature in the amorphous region of 148°–154° C., a shrinkage of 3.3–5% by spinning a polyester polymer having an intrinsic viscosity of 1.0, a diethylene glycol content of 1.0 mol %, a carboxyl group content of 10 eq/$10^6$ g at a spinning speed of 2,000–2,500 m/min to obtain undrawn yarn, drawing the undrawn yarn at about 160° C. thermally treating at 210°–240° C. and dipping the obtained yarn in a conventional rubber solution.

In addition, U.S. Pat. 4,101,525 and 4,195,052 disclose a polyester tire cord produced by a process comprising drawing highly oriented undrawn yarn prepared from a high-speed spinning process to obtain highly oriented drawn yarn, specifically multi-drawn yarn comprising 85 mol% polyethylene terephthalate having a denier per filament of 1 to 20 and a work loss at 150° C. of 0.004–0.02, and dipping the multi-drawn yarn in a rubber solution.

In the above methods, tie molecules, which have an important effect upon dimensional stability (especially shrinkage) are oriented. This leads to residual internal stress and finally causes a lowering of the fatigue resistance of the tire cord. In most of the conventional polyester yarns for tire cord, internal stress produces a temperature rise which induces a continuous increase of thermal stress. This finally results in poor tire cord fatigue resistance because after the tire cord conversion process (or dipping process) comprising dipping the cord in a rubber solution and thermally treating, an internal stress of about 0.5 g/d usually remains in the tire cord.

Moreover, yarns which are highly oriented drawn yarns before undergoing the tire cord conversion process have a definite two-phase structure with both crystalline and amorphous regions. When it is dipped in a rubber solution and thermally treated, deterioration of the crystalline regions occurs and leads to a lowering of strength.

In addition, Japanese patent laid-open No. Sho. 61-146876 discloses a process for producing a polyester tire cord by spinning yarn with a small mass flow rate per spinneret capillary to attain a relatively high Spin-Draw Ratio, thereby obtaining a highly oriented undrawn yarn at a relatively low spinning rate, producing a high strength yarn followed by dipping it in a rubber solution and thermally treating it at a temperature higher than 220° C. This process has a disadvantage in that the beneficial properties of the polyester yarn are lost in the twisting and dipping process due to deterioration of the crystalline portions of the yarn by heat, and the final dipped cord has rather poor properties.

Japanese Patent laid-open No. Sho. 54-77794 discloses a process which comprises treating polyester drawn yarn with an epoxy resin compound prior to dipping in a rubber solution but this process did not solve the above-described problems.

The present invention has been developed to solve the above described problems of the prior art. According to the present invention, the two problems of i) lowering of fatigue resistance due to residual internal stress by high-speed spinning and ii) lowering of strength due to deterioration of the crystalline portions on dipping in a rubber solution can be solved based upon the points described below.

Polyester yarn having a high crystallinity undergoes a high degree of thermal hysteresis and, accordingly, has a high thermal stress. Thus, it tends to undergo a lowering of strength, elastic modulus or strength conversion efficiency due to formation of folded crystals and in particular, from unconstrained molecular chains in the amorphous regions present during recrystallization which subsequent heat treatments, such as dipping process etc., cause. In addition, though a high crystalline polyester yarn itself may exhibit good thermal stability, dimensional stability and fatigue resistance, the yarn has a definite two phase microstructure which may effect a rapid growth of crystal size or long period growth upon subsequent heat treatment so that the fatigue resistance initially exhibited by the yarn itself can not be obtained after it is twisted and subsequently heat-treated.

Conventional tire cords which have been used reinforcers in tire production exhibit a shrinkage of at least 10% when subjected to a high temperature. Moreover, when they have been incorporated into the rubber matrix of a tire, the repeated fatigue movements such as stretching, compression and flexing lower the inherent properties of the fiber such as strength, elastic modulus and toughness. Furthermore, the poor fatigue resistance results in bad tire uniformity.

The present inventors have directed their research towards improving the prior art methods of producing a polyester yarn for tire cord which has excellent overall physical properties like strength, and, at the same time, which has a high strength conversion efficiency and excellent dimensional stability leading to excellent fatigue resistance when used even after having been subjected to a cord conversion process and then incorporated into a rubber matrix. As a result of this research, the present invention has been achieved. Thus, whereas most of the prior art methods comprise producing a polyester yarn having a stable two-phase structure of crystalline and amorphous portions or regions and then simply dipping it into a rubber solution to obtain a final tire cord, the present invention comprises producing a polyester yarn having a three-phase structure of crystalline, amorphous and mesomorphous portions and thereafter subjecting it to recrystallization during a dipping process to obtain a tire cord having a stable two-phase structure.

As the mesomorphous portions present in the yarn are crystallized while being subjected to heat in a dipping process, crystals with a 10% smaller size than the crystals obtained in prior art methods are produced and the present yarn in cord form provides dimensional stability by developing a network structure with uniformly formed crystalline and amorphous portions, and has a high elastic modulus due to the minimization of the formation of folded crystals during recrystallization thereby increasing the content of the strained tie molecular chains which interlink crystals.

Moreover, the present inventors have discovered particular spinning and drawing processes which achieve the above characteristics. Consequently, the process conditions necessary to produce an excellent polyester filamentary yarn have been designed. In more detail, a undrawn yarn is produced which has highly oriented molecular chains in amorphous state such that crystalline diffraction by x-ray is not observed, thereafter the undrawn yarn is drawn at a low draw ratio and a low temperature (below the crystallization temperature) so as to minimize the strain of molecular chains in amorphous regions induced by drawing, and then subjected to thermal treatment and relaxing at a low temperature so that no further crystallization proceeds. The filamentary yarn is then dipped into a rubber solution and thermally treated at certain temperature and tension conditions enabling recrystallization to occur, thereby obtaining a final polyester tire cord.

OBJECTS OF THE INVENTION

The first object of the present invention is to provide a polyester filamentary yarn which exhibits excellent fatigue resistance and dimensional stability both before and after it has been incorporated in a rubber matrix even under the conditions where it is subjected to repeated fatigue behavior at high temperatures (at least 210° C.), and a process for production thereof.

The second object of the present invention is to provide a tire cord comprising a polyester filamentary yarn exhibiting excellent dimensional stability and fatigue resistance useful as a reinforcement in rubber.

The third object of the present invention is to provide a tire exhibiting significantly improved fatigue resistance and dimensional stability even under the conditions of repeated fatigue behavior at high temperatures.

To achieve the above objects, the present invention provides a polyester filamentary yarn comprising at least 90 mol % polyethylene terephthalate and having a fineness of 3 to 5 denier per filament, and possessing a three-phase microstructure consisting of crystalline, amorphous and mesomorphous portions, characterized in that the proportion of said mesomorphous portion is 5 to 15 percent base upon the total amount of crystalline, mesomorphous and amorphous portions.

The present invention additionally provides a polyester filamentary yarn comprising at least 90 mol % polyethylene terephthalate and having a fineness of 3 to 5 denier per filament, characterized in that said yarn satisfies the following characteristics i) a crystalline orientation function (fc) of at most 0.94, ii) an amorphous orientation function (fa) of at least 0.60, iii) fa X (1−Xc)>0.330 (where, Xc is the percent crystallinity, 0.30–0.45); and iv) a long period value of at most 155 Å.

The present invention additionally provides a polyester filamentary yarn comprising at least 90 mol % polyethylene therephthalate and having a fineness of 3 to 5 denier per filament, characterized in that said yarn satisfies the following characteristics:

i) a crystallinity of 30–45 percent by weight;

ii) a crystallite face size [($\bar{1}$05) plane] of at most 65 Å; and iii) a crystal volume of $0.5 \times 10^5$ Å$^3$–$1.54 \times 10^5$ Å$^3$.

The present invention additionally provides a polyester filamentary yarn comprising at least 90 mol % polyethylene terephthalate and having a fineness of 3 to 5 denier per filament, characterized in that said yarn has a maximum thermal stress of at most 0.5 g/d in the temperature range of 60° to 250° C. and exhibits a decrease of thermel stress beyond 210° C.

Also, the present invention provides a process for producing a polyester filamentary yarn from a polyester resin comprising at least 90 mol % polyethylene terephthalate and having an intrinsic viscosity of at least 0.85 by melt-spinning, drawing, thermally treating and relaxing, characterized in that:

1) said polyester resin is spun at a spinning speed of 2,500–4,000 m/min and then solidified by quenching at a quench air temperature of 25° C.-Tg of the polymer to produce a undrawn yarn;

2) said undrawn yarn is drawn at a drawing temperature of Tg of the polymer-120° C. and a total draw ratio of 1.4:1–2.2:1;

3) the obtained drawn yarn is thermally treated at a temperature of 100°–210° C.; and 4) the thermally treated yarn is relaxed at a temperature of at most 140° C. and a relax ratio of 3 to 6%.

In addition, the present invention provides a tire cord formed from a polyester filamentary yarn comprising at least 90 mol % polyethylene terephthalate, characterized in that said cord satisfies the following characteristics:

i) a strength at 10% elongation of at least 100 Newtons, ii) a shrinkage, S, of at most 3.5% obtained upon dry heat treatment at 177° C. during 2 minutes under a dead weight loading of 20 g, iii) a strength at 10% elongation after the treatment as described in the ii) above, L, of at least 65 Newtons, and iv) a coefficient of dimensional stability, L/S, of at least 20.

DESCRIPTION OF THE PREFERRED EMBODIMENTS

The polyester filamentary yarn of the present invention contains at least 90 mol % polyethylene terephthalate, desirably at least 95 mol % polyethylene terephthalate with intermediate effective amounts including 91, 92, 93, 94, 96, 97, 98, 99 and 100 mol %.

Additionally, the polyester yarn of the present invention may contain at most 10 mol %, desirably at most 5 mol %, copolymerized ester units other than polyethylene terephthalate with intermediate effective amounts including 1, 2, 3, 4, 6, 7, 8 and 9 mol %.

The ester-forming ingredients useful as ester units other than polyethylene terephthalate include, for example, glycols such as diethylene glycol, trimethylene glycol, tetramethylene glycol, hexamethylene glycol and dicarboxylic acids such as isophthalic acid, hexahydroterephthalic acid, adipic acid, sebacic acid, azelaic acid, etc.

The polyester filamentary yarn of the present invention usually has a fineness of 3–5 denier per filament, but this value can be widely varied as is apparent to the skilled in this art, and includes yarns with a fineness of from, for example, 0.1–50 denier per filament and beyond.

Polyester filamentary yarn of the present invention comprises crystalline, amorphous and mesomorphous portions. More particularly, it is a polyester yarn having a three-phase structure wherein the mesomorphous portions are present in a significantly higher amount than in the prior art yarns having nearly a completely two-phase structure of crystalline and amorphous portions (wherein the mesomorphous portions are present only in the extremely small amounts if at all).

Figure 1:
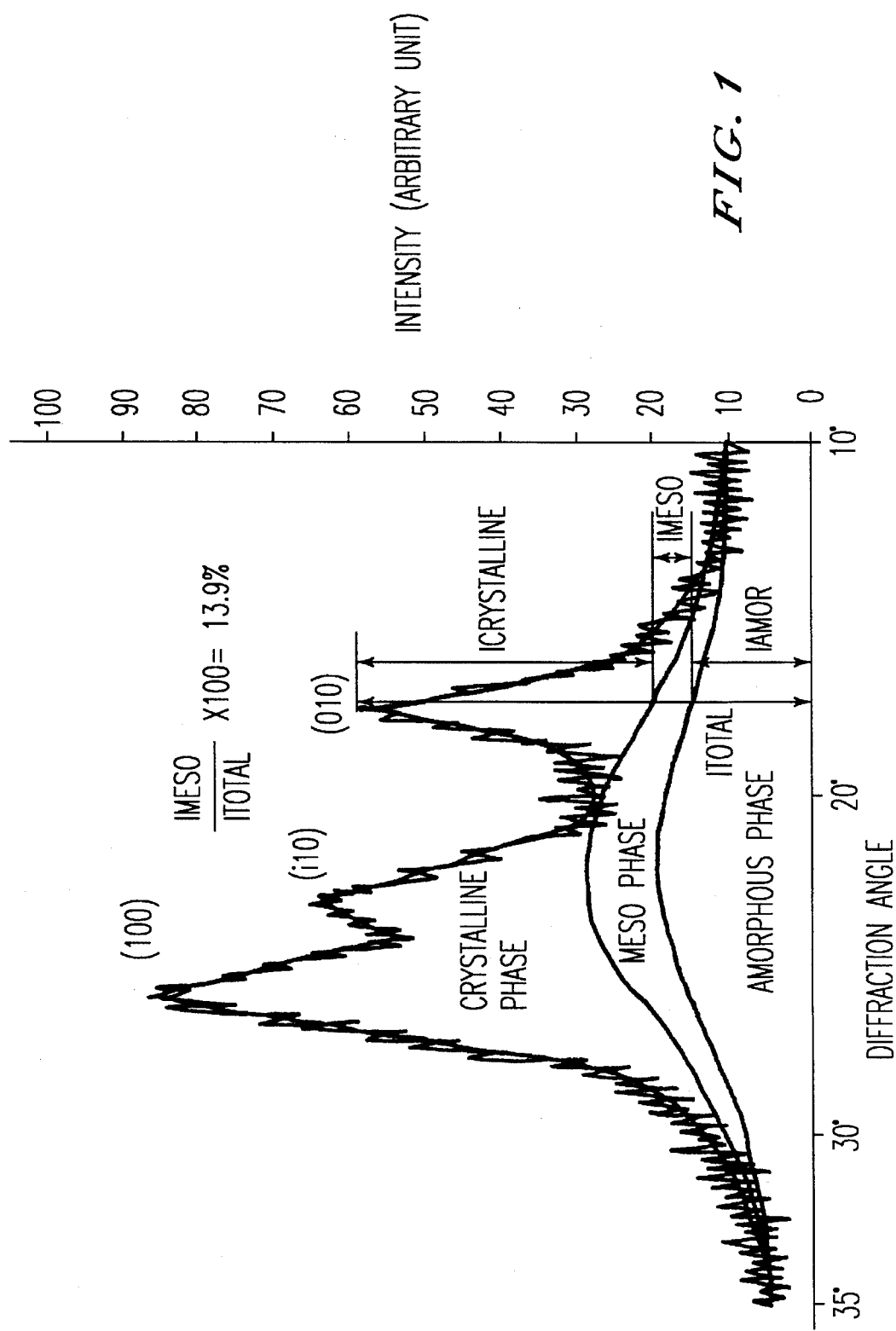
FIG. 1 illustrates a diffractogram obtained from the X-ray diffraction patterns for a polyester filamentary yarn of the present invention.
Figure 2:
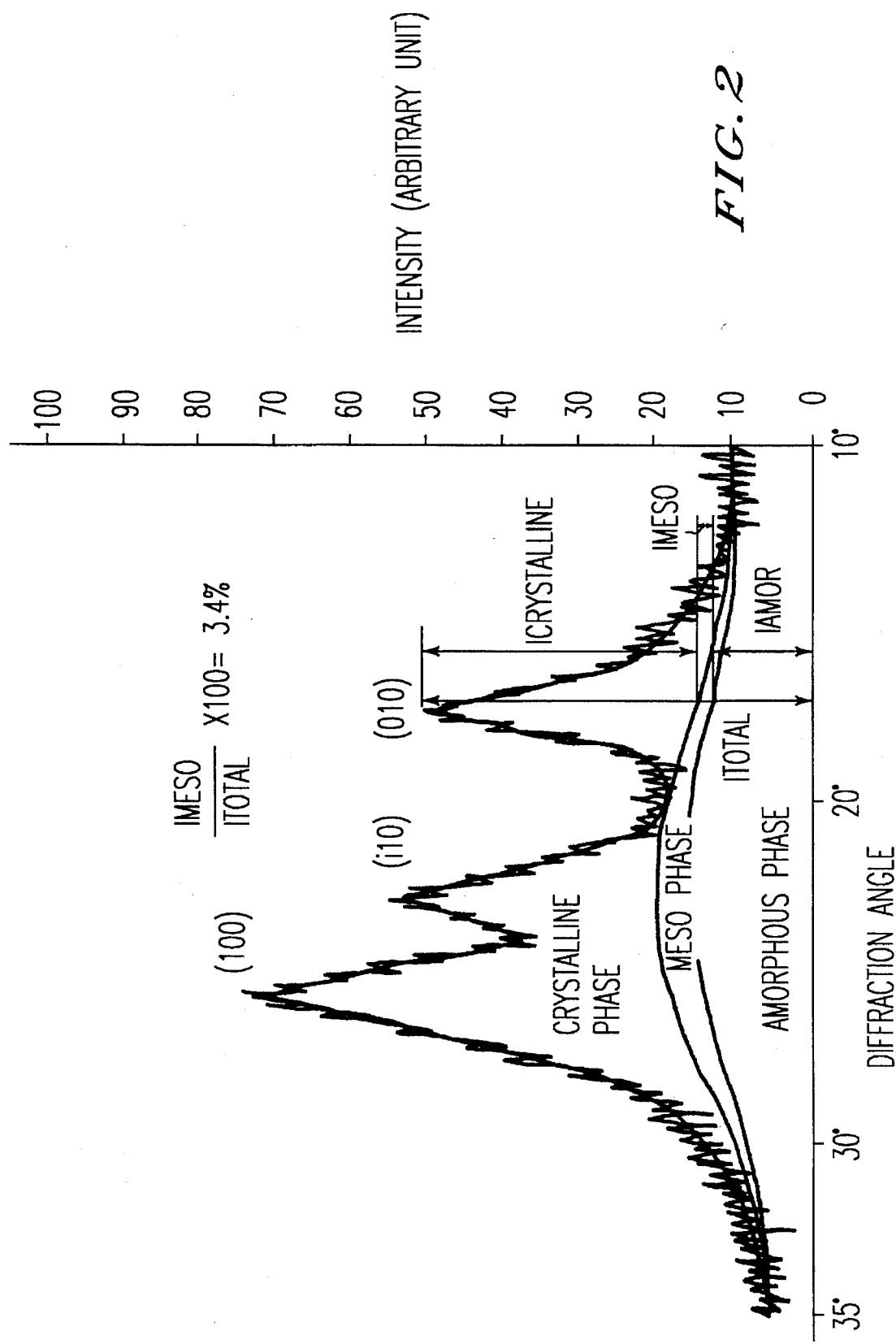
FIG. 2 illustrates a diffractogram obtained from the X-ray diffraction patterns for a polyester filamentary yarn of the prior art.

In the present invention, the word "mesomorphous phase" or "mesophase" is defined to mean the oriented (ordered) amorphous portion of the yarn or fiber which is strictly the portion having some degree of orientation among amorphous portions. The percentage of mesomorphous portion can be calculated from the following formula using X-ray intensity (I) separation procedures on the peak of (010) crystal plane in a diffractogram obtained by quantitatively computing the equatorial X-ray diffraction patterns.(See FIGS. 1 and 2)

$$\text{percentage of mesomorphous portion} = \frac{I \text{ meso}}{I \text{ total}} \times 100$$

($I$ total = $I$ crystalline + $I$ meso + $I$ amorphous)

Polyester yarn of the present invention has 5–15% of a mesomorphous portion as calculated according to the above formula. When this value of less than 5% the smallest amount of mesomorphous portion exists, that is, the structure approaches the two-phase structure of the prior art yarns where I meso≈0 but still provides significant benefits thereover.

On the contrary, when the mesophase portion is more than 15%, difficulties in yarn manufacturing process occur and it is difficult to obtain a sufficient tenacity as is required for a tire cord yarn. Other particular effective amounts of the mesomorphous portion in the present yarn include 6, 7, 8, 9, 10, 11, 12, 13 and 14%.

When a polyester yarn of the present invention having a mesophase portion as described above has been dipped in a rubber solution and thermally treated, the mesophase is transformed into a crystalline phase. A network structure of uniformly distributed crystalline and amorphous portions thus develops providing high dimensional stability. Further, the lowering in strength due to recrystallization is remarkably decreased.

In addition, as the mesophase becomes, or is incorporated into, a crystalline phase, the number of tie molecular chains in the amorphous portion is increased. The tie molecular chains yield good modulus characteristics.

The polyester filamentary yarn of the present invention is characterized by a crystallinity of 30–45 percent by weight.

When it is more than 45 percent by weight, the yarn has a definite structure of crystalline and amorphous portions which yields significantly lower strength as it is subjected to high heat, and the properties of the finally obtained dipped cord are poor. When the crystallinity is less than 30 percent by weight, the filament is so soft that breakage frequently occurs during the yarn manufacturing process. Other effective crystallinities include 32, 34, 36, 38, 40, 42 and 44 percent by weight.

Therefore, according to the present invention any lowering in strength of the yarn is minimized by producing a yarn having a three-phase structure, wherein the crystalline and amorphous phases are not clearly divided due to the coexistence of a mesomorphous phase, allowing only the appropriate stress isolation, and then forming a completed structure of crystalline and amorphous portions by a cord conversion process comprising dipping the yarn in a rubber soln.

The crystallinity may be determined from the following equation using the density ($\rho$, unit: g/cm$^3$) of the fiber.

$$Xc = \frac{\rho c(\rho - \rho a)}{(\rho c - \rho a)}$$

where, $\rho c$ (g/cm$^3$)=1.445

$\rho a$ (g/cm$^3$)=1.335

The density ($\rho$) may be determined by measurements according to density gradient column method using n–heptane and carbon tetrachloride at 25° C.

Furthermore, polyester filamentary yarn of the present invention is characterized in that the value of fa(1–Xc) is equal to or more than 0.33. This expression is intended to define a particular characteristic of the amorphous portion of the material for the purpose of obtaining the three-phase structure of the present invention.

When fa(1–Xc) is less than 0.33 it means that the yarn crystallinity is high or the proportion of oriented amorphous portion is low, which as is found for products like conventional yarns having a two-phase structure. High crystallinity causes a lowering of strength by the action of heat when the yarn is treated to form a tire cord. Alternatively, when the proportion of oriented amorphous portion is low, it becomes difficult to obtain the strength necessary for a tire cord. For this reason, it is necessary to control the characterization parameters of the yarn to within the above preferable range: an amorphous orientation function (fa) of at least 0.6 and a (1–Xc) value of 55–70 percent by weight.

In addition, the present yarn is characterized by a crystalline orientation function (fc) of at most 0.94 and an amorphous orientation function (fa) of at least 0.60.

The crystalline orientation function (fc) may be calculated from the following equation (1) by averaging the orientation functions obtained from the width at half-height (Xh$_{kl}$) of the wide angle X-ray diffraction pattern of ehd (010) and (100) planes of the material:

$$fc = \frac{f(010) + f(100)}{2} \qquad (1)$$

where $$f(hkl) = \left[ 90 - \sin^{-1}\left( \cos \theta_{hkl} \cdot \sin \frac{X_{hkl}}{2} \right) \right] / 90$$

The amorphous orientation function (fa) may be calculated from the following equation (2).

$$fa = \frac{\Delta n - Xc \cdot fc\Delta n_c}{\Delta(1 - Xc)n_a} \qquad (2)$$

where $\Delta n_c$=intrinsic birefringence of crystal (0.220)

$\Delta n_a$=intrinsic birefringence of amorphous (0.275) The birefringence ($\Delta n$) may be calculated from the following equation(3) by measuring the retardation obtained from the interference fringe by the sample using a Berek compensator mounted in a polarizing light microscope.

$$\Delta n = R/d \qquad (3)$$

where d=thickness of sample (nm)

R=retardation (nm)

When the crystalline orientation function is more than 0.94, the crystalline and amorphous portions are clearly defined so that by thermal treatment after dipping, a decrease in strength due to the undesirable growth of crystals and formation of folded chains on the surface of crystal occurs, and the lowering of modulus due to the low degree of orientation in the amorphous portions may be effected thereby to produce a final dipped cord with poor properties. On the contrary, when the amorphous orientation function is less than 0.60, the yarn is already in the stress-isolated state so that properties of the final dipped cord also become poor although the dimensional stability of the yarn may be good.

In the present invention, a yarn with a crystalline orientation function of at most 0.94 and an amorphous orientation function of at least 0.60 is a yarn wherein the crystalline and amorphous portion boundaries are not clearly defined and, besides the crystalline and amorphous portions, the pseudo-crystalline of mesomorphous portion exists.

Such pseudo-crystalline portion corresponds to the mesomorphous phase (mesophase) portion and it mostly exists between microfibrils. This intermicrofibrillar tie molecules are constrained by the crystalline portions present in the microfibrils and thus strongly resistant against deformation inflicted from the outside. This enables the attainment of high modulus characteristics and a decrease in shrinkage by disorientation of amorphous molecular chains at high temperature.

In "New Polyester Tire Cord Development", by Richard R. Dean, appearing in Polyester Textiles, 1988, p 195–212, it is reported that in order to produce a polyester tire cord having good dimensional stability, the effect of intermicrofibrillar tie molecules should be maximized to prevent shrinkage and fibrillization, and fatigue resistance should be increased. As evidenced with the goal of this article, Applicants' unique material has a microstructure which maximizes dimensional stability.

Thus, it is necessary, in order to attain a stabilized structure in the present yarn, to provide a yarn with a crystalline orientation function of at most 0.94 and an amorphous orientation function of at least 0.60. When the present yarn which has such a structure is thermally treated after dipping, part of the intermicrofibrillar tie molecules are incorporated in the crystalline portion and the remainder will exist as intermicrofibrillar tie molecules in the dipped cord. Thereby, yarns are obtained with high dimensional stability which avoid phenomena such as the undesirable increase in long period length and a decrease of linking molecular chains caused by dipping process. That is, a dipped cord with excellent properties is obtained.

In "The Effect of Spinning Speed and Drawing Temperature on Structure and Properties of Poly (ethylene terephthalate) yarns", by R. Huiman and H. M. Heuvel, appearing in *Journal of Applied Polymer Science*, 1989, Vol. 37, p 575–616, it is reported that the shrinkage of polyester fiber is proportional to the product of the amount of amorphous material and the degree of amorphous orientation.

Besides these facts, the present inventors have discovered that the following fact is more important in producing a reinforcing fiber for rubbers such as tires.

A reinforcing fiber for rubbers such as that used in tires under fatigue behavior, including repeated stretching, compression and flexing, is required to have improved toughness and high dimensional stability because it tends to suffer a severe lowering of strength and elastic modulus.

In order to achieve these characteristics, the crystalline portions of the material should be uniformly distributed in the yarn.

The shrinkage phenomenon, which is an important indicator of dimensional stability, is a phenomenon observed when molecular chains are subjected to heat: the length of the molecular chains is shortened as the molecular orientation of amorphous portions becomes loose and disordered.

The part which contributes to a decrease in the dimensional deformation is the crystals adjacent to the amorphous portions. If such crystals form a close network structure, in other words, if the size of the crystals is smaller at equal crystallinity and the value of long period, which is a parameter reflecting the size of the crystal and amorphous regions, is small and a close and regular macrostructure has been formed, such a structure can act to prevent the dimensional deformation such as shrinkage by heat. This yields the same effect as that of forming a crosslink network in a rubber using sulfur.

Thus, enhancing dimensional stability has been limited to a certain extent without the improvement of crystallite size, crystallite distribution and long period.

The present yarn is characterized by a close structure wherein the crystallite size of the plane ($\bar{1}05$) crystal plane perpendicular to the molecular chains is at most 65 Å, the magnitude of crystal volume is from $0.5 \times 10^5$ Å$^3$ to $1.54 \times 10^5$ Å$^3$, and the long period is at most 155 Å.

The long period value may be calculated from the Bragg equation by obtaining the small angle X-ray scattering pattern under the conditions of 50 kV voltage, 200 mA current employing X-ray scattering instrument (the inventors used an instrument manufactured by RIGAKU Co., Ltd. of Japan), using Cu-K $\alpha$ radiation with 1.54 Å wavelength as a light source.

$$d = \lambda/2\theta \text{(Bragg equation)}$$

where
$\lambda = 1.54$ Å
$\theta =$ scattering angle

The crystallite sizes [(100), (010) and ($\bar{1}05$) reflections] may be calculated by obtaining the width at half-height from the equatorial and meridian x-ray diffraction pattern and substituting it in Scherrer equation.

$$L_{hkl} = \frac{k\lambda}{\beta \cos \theta} \text{ (Scherrer equation)}$$

where
$k = 0.9$
$\lambda = 1.54$ Å
$= (b^2 - B^2)^{1/2}$ (b: the width at half-height of peak, B: instrumental constant)

The crystal volume may be calculated from the following formula.

$$\text{Crystal volume} = (\text{crystal size of a axis}) \times (\text{crystal size of b axis}) \times (\text{long period}) \times (\text{crystallinity})$$

Furthermore, the present filamentary yarn is characterized by a terminal modulus of at most 20 g/d.

In general, it is known that the higher the initial modulus or terminal modulus, the more severe the lowering of strength upon twisting and dipping process. However, the present inventors have found that such lowering of strength is more affected by terminal modulus than by initial modulus. But in the case where significant crystallization has progressed in the yarn, the lowering of strength is severe though the terminal modulus is low. Thus, by a high relaxing ratio or strong heat treatment the terminal modulus may be lowered even to a minus(–) value, but in this case the lowering of strength upon twisting and dipping cannot be avoided owing to a high crystallinity.

Another characteristic of the present yarn is thermal stress behaviour as if depends on applied temperature.

A yarn used for reinforcing a rubber is required to have excellent mechanical properties and thus strong tension in the face of drawing and the application of high heat yields accumulated stress.

To isolate most of the stress, a relaxing process has been used in the production of yarn. But the inventors have found as a result of their research that there is a limit in isolating the stress when employing a relaxing process. This is because the accumulated stress is mostly the stress caused by heat generated from drawing, thermal treatment etc.

Therefore, in a conventional yarn producing process the stress isolation inevitably has been limited to an extent.

In addition, another factor to limit the stress isolation present in the methods to isolate stress employing a relaxing process is that even if the degree of orientation is lowered to less than 0.6 as in U.S. Pat. No. 4,101,525 and U.S. Pat. No. 4,195,052, the constraint of the amorphous molecular chains cannot be sufficiently released owing to the folded molecular chains on the crystal surface and a high amount of defects on the crystal interface, and it is not easy to obtain high elastic properties due to the decrease of the proportion of tie molecules.

Therefore, the present yarn is characterized in that the maximum thermal stress is at most 0.5 g/d in the temperature range of 60° C. to 250° C.

All after-treatment temperatures employed to transform a polyester yarn into a reinforcement for rubbers usually exceed 210° C. The conventional polyester yarns for reinforcing a rubber, particulary a tire, normally do not exhibit high thermal stress but do exhibit fairly high thermal stress at high temperatures greater than 210° C. On the contrary, the present yarn has a characteristic where the thermal stress drops gradually beyond 210° C. and the final cord may have a thermal stress less than 0.1 g/d. Accordingly, heat-generation and dimensional properties can be improved significantly so that a cord with excellent fatigue resistance can be produced.

Consequently, the present yarn itself exhibits a high shrinkage of about 8 to 15% in an oven at 150° C. during 30 minutes under zero tension but is a polyester filamentary yarn for reinforcing a rubber with excellent dimensional stability and fatigue resistance owing to the factors such as the above described microstructural characteristics, the compact macrostructure, the network structure of crystals and the significant decrease of thermal stress at high temperatures.

The characteristics of the polyester filamentary yarn will now be described by way of the thermal stress curves in FIG. 3.

Figure 3:
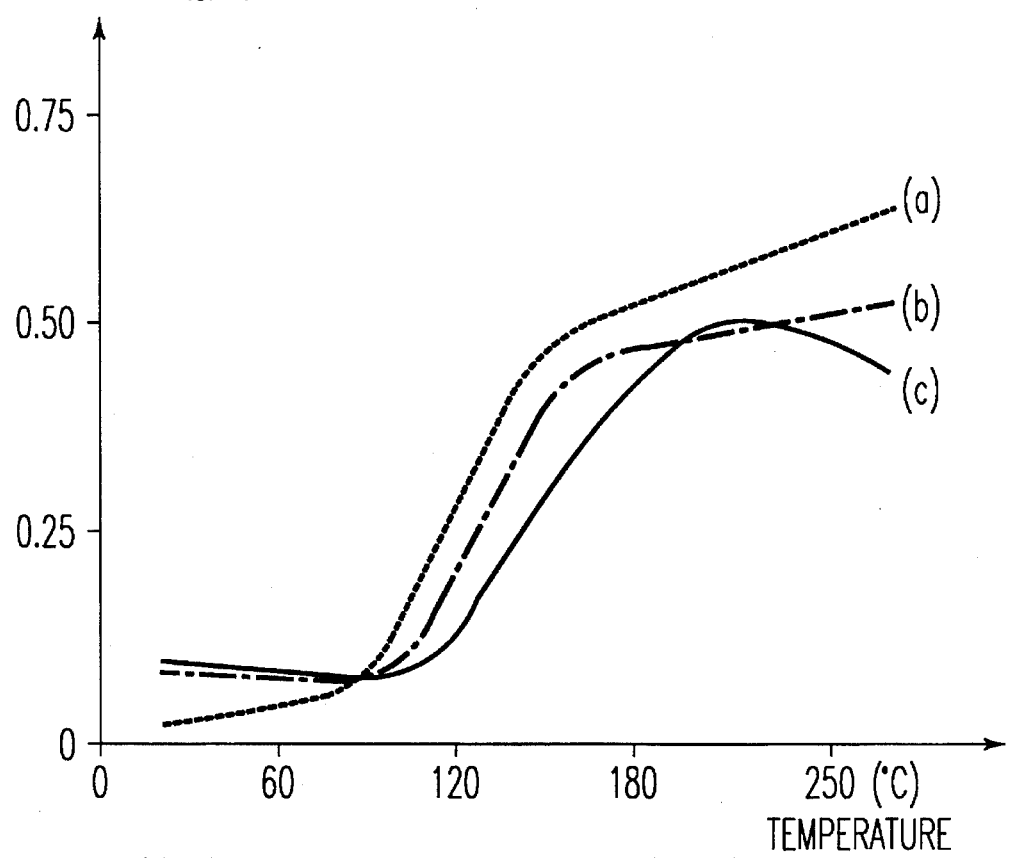
FIG. 3 illustrates a graph plotting the thermal stress values of polyester filamentary yarns vs. temperature.

FIG. 3 illustrates the thermal stress curves obtained from testing the polyester filamentary yarns of 1,000 denier. Curve (a) represents the thermal stress behaviour of a polyester yarn for a tire cord according to the prior art(Comparative examples 8) and curve (b) represents that of a prior art polyester yarn with slightly improved dimensional stability (Comparative example 9) and curve (c) represents that of a polyester yarn of the present invention(Example 5). The testing method used was the measurement of the thermal stress at from ambient temperature to 265° C. with a heating rate of 2.5° C./sec under an initial load of 50 g by a thermal stress analyzer manufactured by KANEBO Co., Japan. The figure demonstrates that the thermal stress of the present yarn decreases beyond 210° C.

A tire cord of the present invention produced from polyester filamentary yarn of the present invention as described above exhibits excellent properties as follows:

i) a strength at 10% elongation (L10) of at least 100 Newton.

ii) a shrinkage, S, of at most 3.5% obtained upon dry heat treatment at 177° C. during 2 minutes under a dead weight loading of 20 g;

iii) a strength at 10% elongation after the treatment in the above ii), L, of at least 65 Newton; and iv) a coefficient of dimensional stability (L/S) of at least 20.

Figure 4:
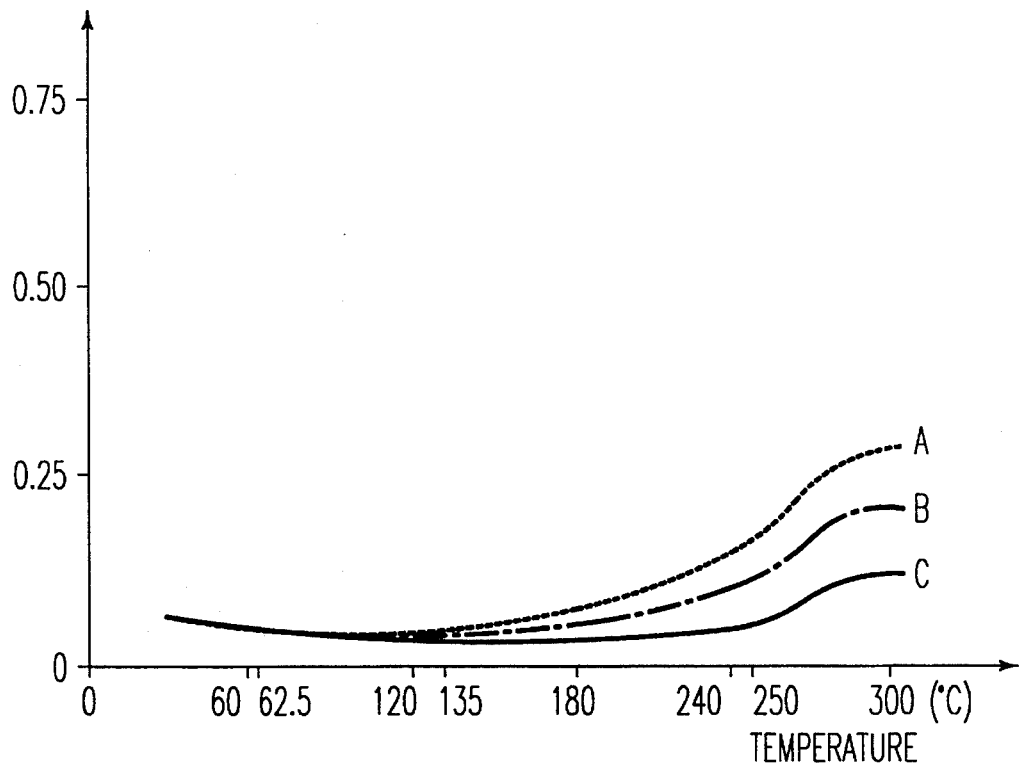
FIG. 4 illustrates a graph plotting the thermal stress values of polyester tire cords vs. temperature.
Figure 5:
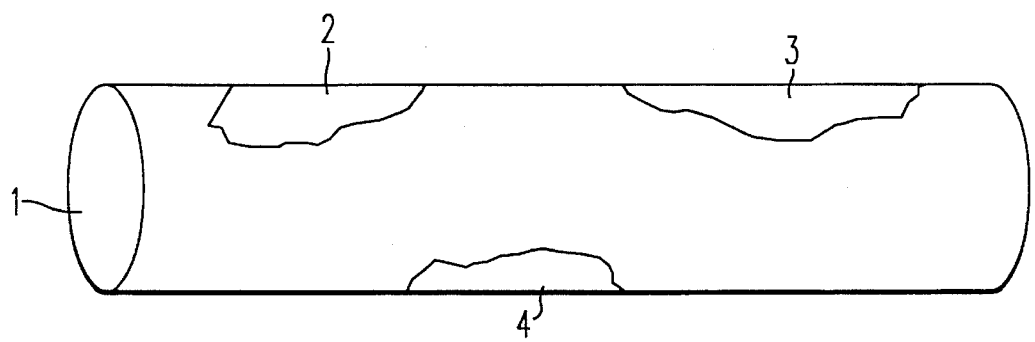
FIG. 5 illustrates the polyester filamentary yarn 1 of the present invention having amorphous portions 2, mesophase portion 3 and crystalline portions 4.

In addition to the above characteristics, the present tire cord has a maximum thermal stress of at most 0.1 g/d as can be seen in FIG. 4.

FIG. 4 illustrates the thermal stress curves obtained from testing the polyester tire cords produced by subjecting the polyester filamentary yarns similar to those used in FIG. 3.

Curve A represents the thermal stress behaviour of a prior art polyester tire cord (Comparative example 17), curve B represents that of a prior art polyester tire cord (Comparative example 15) and curve C represents that of a tire cord according to the present invention (Example 24). The thermal stress was measured at ambient temperature to 300° C. with a heating rate of 2.5° C./sec under an initial load of 50 g by KANEBO thermal stress analyzer.

From the figure, it can be seen that the present tire cord exhibits a significantly lower thermal stress compared to the tire cords of the prior art.

The dipped cord of the present invention exhibits excellent thermal stability, leading to a low shrinkage, because the network structure comprising the uniformly distributed crystalline portions develops well in the cord.

The present inventors have achieved a means to increase the dimensional stability with a lowering of the shrinkage by producing a dipped cord having a network structure wherein the crystalline and amorphous portions are uniformly distributed.

It is generally known that a tire cord having a network structure as described above generates a lot of heat, when it has been incorporated in a tire and subjected to deformation power such as elongation and compression, because a high activation energy is required for the molecular chains existing in the amorphous portions to move, and, as a result, the interior temperature of tire will be increased and accordingly the tire cord will have poor fatigue resistance and a short lifetime. But in practice the opposite phenomenon is observed.

From "Effects of Structure on the Tensile, Creep and Fatigue Properties of Polyester Fibres" by A. R. Bunsell, appearing in *Journal of Material Science*, 1987, Vol. 22, p 4292–4298, it is known that fibers having a network structure wherein the crystals with a small size are uniformly distributed exhibits good fatigue resistance. The present inventors also have verified by experiments that the above described network contributes to excellent fatigue resistance. This is because the fatigue mechanism of tire cord is attributed to the chemical deterioration much more than to physical deterioration.

From "Research for Deterioration of Polyester Tire Cord in Tire" in *Journal of Japanese Rubber Associates*, 1991, Vol. 64, p260–266, it is known that about 80 percent of the deterioration due to fatigue is caused by the hydrolysis and aminolysis of ester bonds in the polyester molecular chains and the remainder is caused by physical deformation.

If a tire cord in tire has a structure wherein a network develops well, movement of the amorphous molecules by exterior elongation, compression and flexing deformation is difficult so that a high amount of heat is generated to increase the temperature and thus to increase the physical fatigue, but it is very small. On the contrary, the present yarn has a high degree of orientation in the amorphous portions which makes the penetration of water and amines difficult, thereby decreasing the chemical deterioration to obtain excellent fatigue resistance.

Now, the process of the present invention will be described in detail.

The polyester used as the starting material may be a polyester with a high polymerization degree such that its intrinsic viscosity is at least 0.85.

The intrinsic viscosity ($\eta$) may be calculated from the following equation by determining the relative viscosity ($\eta r$) of a solution of 8 g of sample in 100 ml of ortho-chlorophenol at 25° C. using an Ostwald viscometer.

$$\eta = 0.0242 \eta r + 0.2634$$

where $$\eta_r = \frac{t \times d}{to \times do}$$

where t: dropping time of solution (in seconds)

to: dropping time of orthochlorophenol (in seconds)

d: density of solution (in g/cc)

do: density of orthochlorophenol (in g/cc)

The degree of polymerization is very important with respect to ultimate dimensional stability and fatigue resistance. In particular, a polymer with a low molecular weight may be used advantageously for dimensional stability but a high molecular weight is preferred for fatigue resistance. In the present invention, optimization of the whole of the properties and a lowering of fatigue resistance can be achieved by selecting a polymer with an intrinsic viscosity of at least 0.85, preferably at least 1.0.

A high-speed spinning process is performed to obtain a highly oriented undrawn yarn with a birefringence of 0.03–0.08, preferably 0.05–0.08. It is important to produce the undrawn yarn exhibiting unique shrinkage behaviour in the prior step before producing the present yarn having a three-phase structure.

When the birefringence is less than 0.03, an excessive drawing is required in the drawing process to get a sufficient strength and modulus of elasticity for rubber-reinforcing fiber.

Accordingly, the degree of orientation is rapidly increased so that the excessive drawing tension yields high residual stress leading to a high shrinkage of the fiber. On the contrary, when it is more than 0.08, the undrawn yarn is already in the state wherein the crystalline and amorphous portions exist in the mixed fashion so that the elongation phenomenon, which occurs when the oriented amorphous portions are crystallized, does not occur and the lowering of strength by high-speed spinning cannot be avoided and thus the final dipped cord has poor properties, especially a very low strength.

The birefringence of the undrawn yarn is proportional to the magnitude of tension which the extruded yarn is subjected to upon reaching the glass transition temperature by cooling with quench air. The magnitude of tension depends upon the spinning speed, the discharge quantity per opening and the temperature of the quench air. In general, the orientation of the undrawn yarn is effected on the point that the extruded yarn from the spinneret reaches a temperature below the glass transition temperature by cooling with quench air. In the present invention, the birefringence is controlled to be 0.03–0.08 with a high tension in the solidification point by heightening the spinning speed to increase the speed of tensile deformation of the extruded yarn or by fixing the spinning speed and increasing the temperature of quench air or reducing the discharge quantity per opening. At this time, to heighten the tension in the solidification point, it is advantageous that the bundle of filaments is slowly cooled so that the solidification point moves as far as possible from the spinneret.

In the case that a high spinning speed is employed (2500–4000 m/min, preferably 3,000–3,600 m/min) to produce a highly oriented undrawn yarn as in the present process, the quench rate becomes different between the inner and outer layer of the polymer stream and thus the spinning stress also becomes different, leading to production of a filamentary yarn having a skin-core structure wherein the inner and outer layer of the filament have different structures from each other. To prevent formation of such a yarn, in the high-speed spinning process it is important to melt-extrude the polymer through an orifice with a ratio of length to diameter (L/D) of 2–4 to form a multifilamentary yarn.

When L/D is less than 2, the temperature difference becomes severe between the inner and outer layer of the filament, which results in formation of the skin-core structure, leading to poor properties. On the contrary, when L/D exceeds 4, the pack pressure rapidly increases so that the operation and handling become difficult and the pack period is to be reduced.

The lowering of strength owing to the temperature difference between the inner and outer layer of the filament can be decreased by increasing the quench temperature to a range of from 25° C. to the glass transition temperature of the polymer, desirably from 40° C. to 60° C. in order to decrease the temperature difference between the inner and outer layer of the filament at the solidification point in a high-speed spinning process. When the temperature is less than 25° C., the filament may be too quickly quenched and thus the tension at the solidification point may be decreased so that it may be difficult to obtain a highly oriented undrawn yarn. On the contrary, when exceeding Tg, the filaments may be insufficiently quenched, so it may be impossible to process further.

Varying the discharge quantity per opening may have a great influence upon the mechanical properties of the yarn. It is advantageous to maintain the fineness of the yarn after drawing within 3 to 5 denier by controlling the spinning conditions and preventing a ununiform quench.

The present process is characterized by drawing at a low draw ratio and at a temperature below the crystallization temperature of the undrawn yarn.

Multi-step drawing of two or more step is preferably used in the present process. The crystallization temperature of a highly oriented undrawn yarn produced by a high-speed spinning process is usually lower by more than 10° C. than that of an undrawn yarn by a low-speed spinning process.

Thus, the drawing temperature is controlled to be in the range of from the glass transition temperature to 120° C., desirably 80° to 90° C. When the drawing temperature exceeds 120° C., fine crystals are already formed before the orientation of the molecular chains and accordingly the drawability is degraded. At temperatures below 80° C., the molecular chains lose their mobility, whereby the efficiency of drawing is low.

The total draw ratio is controlled to be in the range of about 1.4:1 to 2.2:1, desirably 1.4:1 to 1.8:1 and 1.5:1 to 1.7:1. When this ratio is less than 1.4, the fiber attains insufficient strength and in the case exceeding 2.2, high modulus values and low shrinkage cannot be achieved and the percentage of lowering of strength may be high.

The reason why multi-step drawing comprising two or more steps is preferably used in the present process is as follows: if the drawing is performed in one step by drawing to achieve about 70 percent of total draw ratio in the first drawing zone, the period of time taken is not enough for the tangled molecular chains to attain a fibrillar structure so that part of the molecular chains remain in the tangled state. This causes a defect of structure and, accordingly, shrinkage by heat may be increased.

According to the present invention, the shrinkage of the dipped cord can be greatly decreased by use of a highly oriented undrawn yarn produced by the high-speed spinning process such that it is transformed into a liquid-like form rather than undergoes shrinkage when it is subjected to heat after drawing it under specific conditions.

In "Fundamental Aspects of Stress, Deformation and Phase Transitions in Crystallizable Polymers: Experiments with Poly (ethylene terephthalate) in Uniaxial Stress Fields" by P. Desai and A. S. Abhiraman in *Journal of Polymer Science*: Part B, Vol. 26, 1988, p 1657–1675, it is reported that as a result of experiments wherein the initially oriented amorphous polymer was maintained at a temperature between the glass transition temperature and melting temperature and then its behaviour under stress was observed, it is proved that shrinkage is originated from twisted molecular chains in the oriented amorphous portion and transformation to liquid-like form by elongation occurs as the degree of orientation increases when a stress higher than the shrinkage power is applied.

Therefore, the elongation and shrinkage behaviour upon application of heat can be considered to be a phenomenon originated from the difference of elongation power due to crystallization of the oriented amorphous molecular chains.

Accordingly, in the present invention, the mechanism of elongation-shrinkage behaviour is put to use so that the shrinkage can be minimized.

The present inventors have found that in order to maximize the enlogation behaviour like a liquid, crystallization by heat should not occur during drawing. Accordingly, the drawing should be carried out at a low draw ratio and at a temperature below the crystallization temperature of the undrawn yarn. That is to say, when crystallization by heat already has occurred in the drawing process, because the oriented amorphous portion has been transformed into a crystalline portion, the elongation transformation occurring as the oriented amorphous portion is changed to oriented crystals no longer occurs. The shrinkage behaviour only occurs by disorientation of the amorphous molecular chains existing in the amorphous region, which leads to a high shrinkage value.

The present process is characterized in that the thermal treatment of the resulting drawn yarn is carried out at a temperature within the whole range of 100° to 210° C. with effective intermediate temperature including 120°, 140°, 160°, 180° and 200° C., for example.

When the temperature exceeds 210° C., the crystalline and amorphous portions may be previously defined in the yarn. Accordingly, the network structure characteristic of the present invention wherein the development of intermicrofibrillar tie molecules cannot be achieved and the orientation of the crystalline portions is greatly increased and the orientation of the amorphous region is decreased. Therefore, the lowering of strength due to abnormal crystal growth in the subsequent dipping process can not be minimized.

The temperature is one of the important factors to determine the structure of the yarn because in this thermal treatment a yarn with nearly completed orientation is treated. The temperature is required to be in the range of 100° to 210° C., desirably 100° to 180° C. to produce the present polyester yarn for tire cord.

In general, the undrawn yarn before drawing will gain the characteristic properties of the final yarn as it undergoes a drawing process wherein the crystallization and orientation of molecular chains occur by the heat employed in drawing. The orientation in drawing occurs concurrently in the crystalline and amorphous portions, and drawing tension of the amorphous portion is higher than the crystalline portions. Thus, when a yarn for tire cord having such a microstructure is subjected to twisting or to a dipping process to be formed into a tire cord, the mechanical properties of the yarn are often seriously degraded.

In the present invention, this problem is solved by subjecting, the yarn after the drawing process to a relaxing treatment at a relax ratio of 3 to 6 percent at a temperature below 140° C., which is the temperature at which the amorphous molecular chains initiate mobilization, that is, the loss tangent (tan δ) is at a maximum.

When the relaxing temperature is greater than 140° C., the yarn will initiate the creation of defects in the crystalline structure or destruction of the same upon the application of heat in the subsequent dipping process.

When the relax ratio is less than 3 percent, the wind-up tension may be increased and the removal of residual drawing stress may be insufficient, thereby making process difficult. When the relax ratio is more than 6 percent, the strength efficiency may be decreased and the resulting lowering of shrinkage may be so small that the effect cannot remain in the dipped cord.

The resulting polyester filamentary yarn of the present invention produced by the above process is then subjected to a cord conversion process to produce a tire cord of the present invention.

The cord conversion process is described in detail hereinafter. The present yarn is subjected in sequence to dipping in a rubber solution, drying, thermal treatment and normalizing thereby to produce a tire cord. In the above thermal treatment a tension in the range of 0.2 to 0.6 g/d, a temperature in the range of 220° to 250° C. is suitably employed.

If the tension exceeds 0.6 g/d or the temperature exceeds 250° C., a stress much higher than the elongation power originated from the crystallization of the oriented amorphous molecular chains may be applied against the yarn and then it may remain as a residual stress finally in the dipped cord, leading to an increase in shrinkage. When the tension is less than 0.2 g/d, the shrinkage may be decreased but the strength is lowered due to the undesirable growth of the amorphous molecular chains owing to disorientation and folding of the chains. And if the above temperature is less than 220° C., the adhesion of the rubber solution may be insufficient, the shrinkage may increase and, further, it may be impossible to obtain a tire cord with a high crystallinity.

Generally, filaments of in total 1,000 denier, are twisted in more than two strands and formed into a fabric, then this fabric is dipped into a conventional rubber solution and dried. Subsequently, the fabric is thermally treated at the above described temperature and tension, and normalized to obtain a cord fabric, from which the dipped cord of the present invention is obtained.

The thus obtained dipped cord exhibits a strength at 10% elongation of at least 100N measured by the use of an instron type tensile strength tester, and a shrinkage (S) of at most 3.5 percent after thermally treating it in a dry-heat oven at 177° C. under a dead weight loading of 20 g during 2 minutes. In addition, the tire cord after measuring the shrinkage (S) exhibits a high value of strength at 10% elongation (L) of at least 65N.

According to the present invention, a tire cord with a coefficient of dimensional stability (L/S) of at least 20 obtained by multiplying the value (L) by a reciprocal of the shrinkage (S) can be produced.

Now, the present invention will be described in more detail by the Examples and Comparative examples which are illustrative only and are not intended to limit the scope of the invention.

EXAMPLE 1 TO 20 AND COMPARATIVE
EXAMPLE 1 TO 10

A polyethylene terephthalate polymer having an intrinsic viscosity of 1.0 to 1.1 and a terminal carboxyl group content of about 15 eq./10⁶ g was used as a starting material. The polymer was melt-spun at 305° C.

In the melt spinning, a spinneret containing 192 holes and a diameter of 0.5 mm was used in the extrusion. The L/D (ratio of length to diameter) of the orifice was varied within the range of from 2 to 4. A shroud with 200 mm length maintained at 330° C. was placed directly under the spinneret and below the shroud quenching and solidification was carried out with quench air at a temperature less than 80° C.

The other process conditions employed to produce the polyester filamentary yarns are described in Table 1 and 2 which follow.

The flow rate was controlled to produce a final polyester yarn with a fineness of 1,000 total denier. The properties of the obtained yarns are described also in Table 1 and 2 which follow.

EXAMPLE 21 TO 28 AND COMPARATIVE EXAMPLE 11 TO 20

The drawn filamentary yarn produced in the above Examples and Comparative examples was subjected to twisting consisting of first twists of 49 times/10 cm in Z direction and second twists of 49 times/10 cm is S direction and two times of doubling and then formed into a fabric. The resulting fabric was dipped in a rubber treatment solution comprising resorcinol formalin latex and epoxy isocianate and then dried at 160° C. during 60 seconds.

Thereafter, the dipped fabric was thermally treated under the conditions described in Table 3 and 4 which follow, relaxed at 1.5 percent, and normalized at 245° C. for 60 seconds, to finally obtain a polyester tire cord.

The properties of the so obtained tire cord are also described in Table 3 and 4 which follow.

The tests of the properties appearing in Table 1 to 4 were performed according to the following methods.

1. tenacity and elongation: in accordance with JIS-L1017 method.

Instrument : low-speed elongation type tensile strength tester from Instron Co., Ltd., tensile speed: 300 mm/min, length of sample: 250 mm, atmospheric conditions: 25° C., 65% RH.

2. medium elongation

The elongation value at a load of 4.5 g/d in the elongationload curve obtained in accordance with JIS-L1017 method using an instrument same as that used in above 1).

3. shrinkage of yarn:

The value ($\Delta\delta$, in percent) calculated from the following equation wherein $L_0$ is the length of a sample measured under a load of 20 g after it has been placed at 25° C., 65% RH during more than 24 hours, and $L_1$ is the length after it has been placed in the oven at 150° C. during 30 minutes under zero load.

$$\Delta\delta\,(\%) = \frac{L_0 - L_1}{L_0} \times 100$$

4. shrinkage of cord

The value calculated from the following equation wherein $l_0$ is the length of a cord sample taken from a cord fabric measured under a dead weight loading of 20 g after it has been placed at 25° C., 65% RH during more than 24 hours, and l1 is the length of same measured after it has been placed in an oven at 177° C. during minutes under a dead weight loading of 20 g.

$$\Delta S\,(\%) = \frac{l_0 - l_1}{l_0} \times 100$$

5. Percentage of retained strength of cord: in accordance with ASTM D 885 method.

The value obtained from the following formula by measuring the strength of a cord sample taken from a tire, before and after hours rotation at an inner tube pressure of 3.5 kg/cm², rotation speed of 850 rpm and tube angle of 80° C.

$$\text{Percentage of retained strength (\%)} = \frac{\text{strength after testing}}{\text{strength before testing}} \times 100$$

TABLE 1

| Parameters and properties | Example 1 | Example 2 | Example 3 | Example 4 | Example 5 | Example 6 | Example 7 | Example 8 | Example 9 | Example 10 |
|---|---|---|---|---|---|---|---|---|---|---|
| I.V. of polymer | 1.1 | 1.0 | 1.0 | 1.0 | 1.0 | 1.0 | 1.1 | 1.0 | 1.0 | 1.0 |
| L/D of orifice | 2 | 2 | 2 | 3 | 3 | 3 | 3 | 3 | 3 | 3 |
| quench air temp. (°C.) | 25 | 40 | 25 | 60 | 50 | 40 | 40 | 40 | 50 | 60 |
| spinning speed (m/min) | 2500 | 3500 | 3800 | 3400 | 2500 | 3600 | 3000 | 3200 | 4000 | 2700 |
| birefringence | 0.032 | 0.060 | 0.066 | 0.069 | 0.040 | 0.070 | 0.060 | 0.064 | 0.080 | 0.044 |
| temp. of 1st draw zone (°C.) | 90 | 90 | 100 | 70 | 80 | 80 | 90 | 80 | 90 | 90 |
| draw ratio of 1st draw | 1.80 | 1.64 | 1.65 | 1.65 | 1.85 | 1.76 | 1.70 | 1.65 | 1.60 | 1.80 |
| temp. of 2nd draw zone (°C.) | 100 | 90 | 100 | 90 | 110 | 90 | 90 | 90 | 90 | 100 |
| draw ratio of 2nd draw | 1.2 | 1.1 | 1.06 | 1.1 | 1.11 | 1.05 | 1.06 | 1.06 | 1.03 | 1.06 |
| total draw ratio | 2.08 | 1.75 | 1.60 | 1.76 | 1.97 | 1.79 | 1.74 | 1.68 | 1.58 | 1.84 |
| temp. of heat treatment (°C.) | 200 | 180 | 190 | 180 | 160 | 170 | 170 | 180 | 170 | 180 |
| relax temp. (°C.) | 30 | 100 | 80 | 80 | 30 | 140 | 130 | 120 | 130 | 30 |
| relax ratio (%) | 3.5 | 3.2 | 3.0 | 3.0 | 4.0 | 3.0 | 3.6 | 4.0 | 4.0 | 3.5 |
| tenacity (g/d) | 8.5 | 8.0 | 7.0 | 7.3 | 8.3 | 8.6 | 7.4 | 7.3 | 7.2 | 7.6 |
| elongation (%) | 12.0 | 12.6 | 15.2 | 13.2 | 12.2 | 12.1 | 13.5 | 14.2 | 15.0 | 14.0 |
| medium elongation (%) | 4.5 | 5.0 | 7.2 | 7.0 | 5.2 | 4.4 | 6.2 | 6.3 | 7.2 | 6.2 |
| shrinkage (%) | 12.0 | 11.0 | 10.3 | 11.2 | 13.0 | 12.6 | 11.4 | 11.2 | 10.0 | 11.3 |
| maximum thermal stress | 0.48 | 0.46 | 0.29 | 0.43 | 0.50 | 0.50 | 0.40 | 0.38 | 0.28 | 0.34 |

TABLE 1-continued

| | | | | | | | | | | |
|---|---|---|---|---|---|---|---|---|---|---|
| (g/d, 60–250° C.) | | | | | | | | | | |
| thermal stress behavior beyond 210° C. | decrease | decrease | decrease | decrease | decrease | decrease | decrease | decrease | decrease | decrease |
| long period (Å) | 154 | 150 | 153 | 140 | 148 | 155 | 140 | 150 | 139 | 135 |
| crystallite size of (lo5) plane (Å) | 65 | 64 | 65 | 60 | 62 | 63 | 58 | 64 | 64 | 63 |
| crystal volume ($\times 10^5$ Å$^3$) | 1.45 | 1.43 | 1.42 | 1.40 | 0.92 | 1.32 | 0.54 | 1.30 | 0.62 | 0.54 |
| crystalline orientation function (fc) | 0.924 | 0.921 | 0.911 | 0.901 | 0.924 | 0.938 | 0.920 | 0.911 | 0.912 | 0.919 |
| amorphous orientation function (fa) | 0.645 | 0.634 | 0.622 | 0.621 | 0.632 | 0.652 | 0.610 | 0.611 | 0.600 | 0.620 |
| terminal modulus (g/d) | 19.5 | 18.5 | 16.4 | 16.9 | 18.9 | 19.9 | 16.6 | 17.0 | 16.5 | 17.1 |
| crystallinity (wt %) | 45 | 42 | 43 | 40 | 38 | 35 | 42 | 43 | 41 | 40 |
| fa (1 − Xc) | 0.355 | 0.368 | 0.355 | 0.373 | 0.392 | 0.424 | 0.354 | 0.348 | 0.354 | 0.372 |
| proportion of mesophase (%) $= \dfrac{I\,meso}{I\,total} \times 100$ | 7.8 | 11.0 | 10.5 | 12.6 | 13.3 | 13.9 | 11.2 | 10.7 | 11.9 | 12.2 |

| Parameters and properties | Example No. | | | | | | | | | |
|---|---|---|---|---|---|---|---|---|---|---|
| | Example 11 | Example 12 | Example 13 | Example 14 | Example 15 | Example 16 | Example 17 | Example 18 | Example 19 | Example 20 |
| I.V. of polymer | 1.1 | 1.0 | 1.1 | 1.1 | 1.1 | 1.1 | 1.1 | 1.0 | 1.1 | 1.1 |
| L/D of orifice | 2 | 2 | 2 | 3 | 2 | 3 | 3 | 4 | 4 | 4 |
| quench air temp. (°C.) | 25 | 25 | 40 | 40 | 60 | 60 | 50 | 60 | 30 | 60 |
| spinning speed (m/min) | 2700 | 2900 | 3400 | 3800 | 3000 | 2900 | 3500 | 3200 | 4000 | 3600 |
| birefringence | 0.042 | 0.046 | 0.065 | 0.075 | 0.057 | 0.052 | 0.068 | 0.065 | 0.080 | 0.072 |
| temp. of 1st draw zone (°C.) | 90 | 90 | 90 | 80 | 80 | 80 | 80 | 80 | 100 | 70 |
| draw ratio of 1st draw | 1.90 | 2.05 | 1.70 | 1.50 | 1.35 | 1.50 | 1.65 | 1.60 | 1.40 | 1.70 |
| temp. of 2nd draw zone (°C.) | 100 | 100 | 90 | 90 | 90 | 120 | 90 | 80 | 100 | 90 |
| draw ratio of 2nd draw | 1.14 | 1.05 | 1.03 | 1.05 | 1.32 | 1.33 | 1.04 | 1.07 | 1.14 | 1.08 |
| total draw ratio | 2.10 | 2.07 | 1.67 | 1.53 | 1.71 | 1.93 | 1.63 | 1.63 | 1.53 | 1.76 |
| temp. of heat treatment (°C.) | 120 | 160 | 180 | 180 | 160 | 170 | 180 | 180 | 160 | 170 |
| relax temp. (°C.) | 30 | 30 | 120 | 120 | 100 | 100 | 30 | 30 | 140 | 140 |
| relax ratio (%) | 3 | 4 | 4.5 | 3 | 4 | 3.5 | 5 | 5 | 4 | 4 |
| tenacity (g/d) | 7.7 | 8.4 | 7.6 | 7.2 | 7.7 | 8.0 | 7.5 | 7.4 | 7.0 | 8.0 |
| elongation (%) | 12.8 | 13.0 | 14.8 | 15.1 | 14.9 | 12.5 | 14.2 | 14.1 | 15.4 | 11.3 |
| medium elongation (%) | 5.4 | 4.9 | 6.8 | 7.2 | 6.7 | 5.2 | 7.0 | 6.5 | 7.2 | 4.6 |
| shrinkage (%) | 13.0 | 12.4 | 11.4 | 10.2 | 11.2 | 12.5 | 11.2 | 11.2 | 10.4 | 12.6 |
| maximum thermal stress (g/d, 60–250° C.) | 0.48 | 0.42 | 0.36 | 0.24 | 0.36 | 0.43 | 0.40 | 0.38 | 0.36 | 0.46 |
| thermal stress behavior beyond 210° C. | decrease | decrease | decrease | decrease | decrease | decrease | decrease | decrease | decrease | decrease |
| long period (Å) | 153 | 152 | 150 | 151 | 140 | 154 | 142 | 152 | 153 | 152 |
| crystallite size of (lo5) plane (Å) | 61 | 65 | 63 | 64 | 60 | 63 | 60 | 60 | 63 | 64 |
| crystal volume ($\times 10^5$ Å$^3$) | 1.51 | 1.49 | 1.43 | 1.44 | 1.32 | 1.52 | 1.43 | 1.40 | 1.45 | 1.48 |
| crystalline orientation function (fc) | 0.924 | 0.935 | 0.929 | 0.911 | 0.928 | 0.938 | 0.919 | 0.921 | 0.909 | 0.936 |
| amorphous orientation function (fa) | 0.639 | 0.632 | 0.621 | 0.601 | 0.620 | 0.609 | 0.611 | 0.609 | 0.601 | 0.650 |
| terminal modulus (g/d) | 19.6 | 19.4 | 18.0 | 17.5 | 18.0 | 18.8 | 18.6 | 18.2 | 17.0 | 19.7 |
| crystallinity (wt %) | 32 | 38 | 42 | 40 | 35 | 36 | 41 | 44 | 39 | 33 |
| fa (1 − Xc) | 0.445 | 0.392 | 0.360 | 0.361 | 0.403 | 0.390 | 0.360 | 0.341 | 0.367 | 0.436 |
| proportion of mesophase (%) $= \dfrac{I\,meso}{I\,total} \times 100$ | 14.9 | 13.7 | 11.1 | 12.5 | 14.2 | 13.8 | 11.8 | 10.2 | 12.4 | 14.8 |

TABLE 2

| Parameters and properties | comp. example 1 | comp. example 2 | comp. example 3 | comp. example 4 | comp. example 5 | comp. example 6 | comp. example 7 | comp. example 8 | comp. example 9 | comp. example 10 |
|---|---|---|---|---|---|---|---|---|---|---|
| I.V. of polymer | 1.0 | 1.0 | 1.0 | 1.0 | 1.0 | 1.0 | 1.0 | 1.0 | 1.0 | 1.0 |
| L/D of orifice | 2.5 | 2.5 | 2.5 | 3 | 3 | 3 | 4.5 | 3 | 3 | 3 |
| quench air temp. (°C.) | 25 | 25 | 25 | 25 | 40 | 40 | 40 | 25 | 40 | 40 |
| spinning speed (m/min) | 1800 | 1800 | 2500 | 3000 | 3000 | 4800 | Handling was impossible | 600 | 3050 | 3500 |
| birefringence | 0.020 | 0.020 | 0.03 | 0.036 | 0.040 | 0.098 | | 0.003 | 0.04 | 0.052 |
| temp. of 1st draw zone (°C.) | 90 | 90 | 90 | 130 | 100 | 80 | | 110 | 110 | 110 |
| draw ratio of 1st draw | 2.15 | 2.15 | 2.10 | 1.80 | 1.80 | 1.80 | | 4.0 | 1.5 | 1.3 |
| temp. of 2nd draw zone (°C.) | 100 | 100 | 100 | 150 | 130 | 90 | | 220 | 220 | 220 |
| draw ratio of 2nd draw | 1.07 | 1.07 | 1.05 | 1.03 | 1.03 | 1.04 | | 1.4 | 1.1 | 1.03 |
| total draw ratio | 2.22 | 2.22 | 2.17 | 1.78 | 1.72 | 1.28 | | 5.26 | 1.58 | 1.30 |
| temp. of heat treatment (°C.) | 190 | 245 | 220 | 200 | 220 | 180 | | 240 | 240 | 240 |
| relax temp. (°C.) | 150 | 140 | 230 | 130 | 240 | 140 | | 180 | 180 | 180 |
| relax ratio (%) | 3.5 | 3.5 | 4 | 4 | 7 | 5 | | 6 | 4 | 3 |
| tenacity (g/d) | 8.9 | 8.8 | 8.5 | Handling was impossible | 8.0 | 6.2 | (Pack pressure was increased) | 8.9 | 8.14 | 7.95 |
| elongation (%) | 11.0 | 12.1 | 13.4 | | 14.9 | 15.8 | | 14.1 | 13.7 | 14.4 |
| medium elongation (%) | 4.0 | 4.4 | 5.0 | | 6.5 | 8.4 | | 4.8 | 6.6 | 6.5 |
| shrinkage (%) | 11.3 | 7.4 | 7.0 | | 5.0 | 5.2 | | 10.5 | 5.9 | 5.6 |
| maximum thermal stress (g/d, 60~250° C.) | 0.56 | 0.49 | 0.42 | | 0.30 | 0.24 | | 0.65 | 0.54 | 0.51 |
| thermal stress behavior beyond 210° C. | increase | increase | increase | | increase | increase | | increase | increase | increase |
| long period (Å) | 153 | 157 | 159 | | 161 | 156 | | 155 | 142 | 142 |
| crystallite size of (lo5) plane (Å) | 64 | 66 | 67 | | 69 | 68 | | 68 | 65 | 65 |
| crystal volume (×10$^5$ Å$^3$) | 1.50 | 1.55 | 1.57 | | 1.58 | 1.54 | | 2.0 | 1.57 | 1.55 |
| crystalline orientation function (fc) | 0.946 | 0.932 | 0.941 | | 0.943 | 0.911 | | 0.932 | 0.944 | 0.945 |
| amorphous orientation function (fa) | 0.620 | 0.502 | 0.501 | | 0.468 | 0.511 | | 0.435 | 0.500 | 0.510 |
| terminal modulus (g/d) | 23.1 | 19.6 | 18.4 | | 16.4 | 18.4 | | 34.1 | 16 | 14 |
| crystallinity (wt %) | 47 | 55 | 51 | | 54 | 48 | | 50 | 53 | 53 |
| fa (1 − Xc) | 0.329 | 0.226 | 0.245 | | 0.215 | 0.266 | | 0.217 | 0.235 | 0.240 |
| proportion of mesophase (%) = $\frac{I\,meso}{I\,total} \times 100$ | 4.8 | 2.9 | 3.6 | | 2.7 | 4.5 | | 3.9 | 3.4 | 3.2 |

TABLE 3

| | Example 21 | Example 22 | Example 23 | Example 24 | Example 25 | Example 26 | Example 27 | Example 28 |
|---|---|---|---|---|---|---|---|---|
| example no. of the used yarn | 1 | 4 | 8 | 9 | 12 | 15 | 18 | 19 |
| temperature (°C.) | 240 | 245 | 230 | 240 | 220 | 240 | 250 | 240 |
| tension (g/d) | 0.6 | 0.3 | 0.5 | 0.3 | 0.6 | 0.3 | 0.2 | 0.5 |
| strength (L10; Newton) | 104 | 106 | 102 | 105 | 107 | 106 | 102 | 101 |
| shrinkage (S; %) | 3.1 | 3.1 | 2.9 | 3.0 | 3.3 | 3.2 | 3.0 | 3.2 |
| strength after dry-heat (L;Newton) | 72.1 | 72.8 | 71.5 | 72.5 | 74.2 | 73.0 | 70.9 | 70.0 |
| L/S | 23.2 | 23.4 | 24.6 | 24.1 | 22.5 | 22.8 | 23.6 | 21.9 |
| maximum thermal stress (g/d) | 0.07 | 0.08 | 0.06 | 0.06 | 0.08 | 0.09 | 0.07 | 0.09 |
| percentage of retained strength of cord (%) | 96 | 96 | 98 | 97 | 95 | 95 | 97 | 94 |

TABLE 4

|  | comp. example 11 | comp. example 12 | comp. example 13 | comp. example 14 | comp. example 15 | comp. example 16 | comp. example 17 | comp. example 18 | comp. example 19 | comp. example 20 |
|---|---|---|---|---|---|---|---|---|---|---|
| example no. of the used yarn | 1 | 8 | 15 | 19 | comp. example 1 | comp. example 3 | comp. example 5 | comp. example 8 | comp. example 9 | comp. example 10 |
| temperature (°C.) | 210 | 240 | 200 | 250 | 240 | 245 | 230 | 240 | 250 | 240 |
| tension (g/d) | 0.4 | 0.1 | 0.1 | 0.7 | 0.6 | 0.3 | 0.5 | 0.3 | 0.2 | 0.5 |
| strength (L10; Newton) | 104 | 95 | 96 | The cord was cut | 82 | 79 | 83 | 82 | 80 | 80 |
| shrinkage (S; %) | 4.1 | 3.5 | 3.4 |  | 4.0 | 3.9 | 4.9 | 4.0 | 3.5 | 4.7 |
| strength after dry-heat (L; Newton) | 70.2 | 65.1 | 66.2 |  | 50.4 | 52 | 56 | 54.2 | 53.5 | 52 |
| L/S | 17.1 | 18.6 | 19.4 |  | 12.6 | 13.3 | 11.4 | 13.6 | 15.3 | 11.1 |
| maximum thermal stress (g/d) | 0.18 | 0.09 | 0.08 |  | 0.25 | 0.22 | 0.29 | 0.19 | 0.15 | 0.20 |
| percentage of retained strength of cord (%) | 90 | 93 | 92 |  | 85 | 88 | 90 | 87 | 86 | 87 |

From the result in Table 3, it can be seen that the present tire cord has a shrinkage less than 3.5 percent at 150° C. over 30 minutes under zero tension and a coefficient of dimensional stability of at least 20 and thus exhibits excellent dimensional stability. Also, it can be seen that the present tire cord has a strength at 10% elongation of at least 100N and a strength at 10% elongation after the dry-heat treatment of at least 65N accordingly it has good fatigue resistance. Though the present invention has been described by the preferred embodiments, it is understood that the variation and modification apparent to the skilled in this art is possible. Such variation and modification should be considered to be included within the spirit and scope of the present claims which follow.

What is claimed is:

1. A polyester filamentary yarn comprising at least 90 mol. % polyethylene terephalate and having a fineness of 3–5 denier per filament wherein said polyester has a crystalline orientation function (fc) of at most 0.94, percent crystallinity (Xc) of 0.320–0.45, and has a three-phase microstructure consisting of crystalline, amorphous and mesomorphous portions, the proportion of the mesomorphous portion is 5–15 percent based upon the total amount of crystalline, amorphous and mesomorphous portions of said polyester, and wherein the amount of the mesomorphous portion and the total amount of crystalline, amorphous and mesomorphous portions are determined by the equation percent of mesomorphous portion=I meso/I total×100, wherein I meso is the amount of mesomorphous portion in the polyester calculated from the X-ray intensity of the peak for the (010) crystal plane in a quantitative equatorial diffraction pattern of the polyester and I total is the sum of the crystalline, mesomorphous and amorphous portions of the polyester calculated from said quantitative equatorial X-ray diffraction pattern.

2. The polyester yarn of claim 1, wherein said yarn has:
   i) a crystalline orientation function (fc) of at most 0.94,
   ii) an amorphous orientation function (fa) of at least 0.60,
   iii) a long period value of at most 155 Å, where fa(1−Xc)>0,330 where Xc is the percent crystallinity and is a value of 0.30–0.45.

3. The polyester yarn of claim 2, wherein said polyester has a three-phase microstructure consisting of crystalline, amorphous and mesomorphous portions, the proportion of the mesomorphous portion is 5–15 percent based upon the total amount of crystalline, amorphous and mesomorphous portions of said polyester, and wherein the amount of the mesomorphous portion and the total amount of crystalline, amorphous and mesomorphous portions are determined by the equation percent of mesomorphous portion=I meso/I total×100, wherein I meso is the amount of mesomorphous portion in the polyester calculated from the X-ray intensity of the peak for the (010) crystal plane in a quantitative equatorial diffraction pattern of the polyester and I total is the sum of the crystalline, mesomorphous and amorphous portions of the polyester calculated from said quantitative equatorial X-ray diffraction pattern.

4. The polyester yarn of claim 2, wherein said yarn has a terminal modulus of at most 20 g/d.

5. The polyester yarn of claim 1, wherein said yarn has a terminal modulus of at most 20 g/d.

6. The polyester yarn of claim 1, where said yarn has a crystal volume of $0.5$–$1.54 \times 10^5$ Å$^3$.

7. A polyester filamentary yarn comprising at least 90 mol % polyethylene therephthalate and having a fineness of 3–5 denier per filament, wherein said yarn is:
   i) a crystallinity of 30–45 percent by weight,
   ii) a crystallite size in the of at most 65 Å
   iii) a crystal volume of $0.5 \times 10^5$ Å$^3$–$1.54 \times 10^5$ Å$^3$.

8. The polyester yarn of claim 7, wherein said yarn has:
   i) a crystalline orientation function (fc) of at most 0.94,
   ii) an amorphous orientation function (fa) of at least 0.60,
   iii) a long period value of at most 155 Å, where fa(1−Xc) 0.330 where Xc is the percent crystallinity and is a value of 0.30–0.45.

9. The polyester yarn of claim 8, wherein said polyester has a three-phase microstructure consisting of crystalline, amorphous and mesomorphous portions, the proportion of the mesomorphous portion is 5–15 percent based upon the total amount of crystalline, amorphous and mesomorphous portions of said polyester, and wherein the amount of the mesomorphous portion and the total amount of crystalline, amorphous and mesomorphous portions are determined by the equation percent of mesomorphous portion=I meso/I total×100, wherein I meso is the amount of mesomorphous portion in the polyester calculated from the X-ray intensity of the peak for the (010) crystal plane in a quantitative equatorial diffraction pattern of the polyester and I total is the sum of the crystalline, mesomorphous and amorphous portions of the polyester calculated from said quantitative equatorial X-ray diffraction pattern.

10. The polyester yarn of claim 8, wherein said yarn has a terminal modulus of at most 20 g/d.

11. A polyester filamentary yarn comprising at least 90 mol % polyethylene therephthalate and having a fineness of 3–5 denier per filament, wherein said yarn has a maximum thermal stress of at most 0.5 g/d in the temperature range of from 60° C. to 250° C. and exhibits decreasing slope above 210° C. in a thermal stress versus temperature curve.

12. The polyester yarn of claim 11, wherein said yarn has:
   i) a crystalline orientation function (fc) of at most 0.94,
   ii) an amorphous orientation function (fa) of at least 0.60,
   iii) a long period value of at most 155 Å, where fa(1–Xc)>0.330 where Xc is the percent crystallinity and is a value of 0.30–0.45.

13. The polyester yarn of claim 12, wherein said polyester has a three-phase microstructure consisting of crystalline, amorphous and mesomorphous portions, the proportion of the mesomorphous portion is 5–15 percent based upon the total amount of crystalline, amorphous and mesomorphous portions of said polyester, and wherein the amount of the mesomorphous portion and the total amount of crystalline, amorphous and mesomorphous portions are determined by the equation percent of mesomorphous portion=I meso/I total×100, wherein I meso is the amount of mesomorphous portion in the polyester calculated from the X-ray intensity of the peak for the (010) crystal plane in a quantitative equatorial diffraction pattern of the polyester and I total is the sum of the crystalline, mesomorphous and amorphous portions of the polyester calculated from said quantitative equatorial X-ray diffraction pattern.

14. The polyester yarn of claim 12, wherein said yarn has a terminal modulus of at most 20 g/d.

15. A polyester filamentary yarn comprising at least 90 mol % polyethylene terephthalate and having a fineness of 3–5 denier per filament, wherein said yarn has:
   i) a crystalline orientation function (fc) of at most 0.94,
   ii) an amorphous orientation function (fa) of at least 0.60,
   iii) a long period value of at most 155 Å
and where said yarn is characterized in that fa(1–xc)>0.330 where Xc is the percent crystallinity and is a value of 0.30–0.45.

* * * * *